(12) United States Patent
Ohshima et al.

(10) Patent No.: US 6,437,794 B1
(45) Date of Patent: *Aug. 20, 2002

(54) INTERACTIVE IMAGE GENERATION METHOD AND APPARATUS UTILIZING A DETERMINATION OF THE VISUAL POINT POSITION OF AN OPERATOR

(75) Inventors: Toshikazu Ohshima, Kawasaki; Hiroyuki Yamamoto, Chigasaki; Shinji Uchiyama, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/640,081

(22) Filed: Apr. 30, 1996

(30) Foreign Application Priority Data

May 15, 1995 (JP) ............................................. 7-115746

(51) Int. Cl.[7] ............................................. G06T 11/00
(52) U.S. Cl. ...................... 345/619; 345/700; 345/648; 345/649
(58) Field of Search ................................. 345/437, 436, 345/433, 419, 126, 326, 158, 978, 648, 649, 619, 700, 702

(56) References Cited

U.S. PATENT DOCUMENTS

| | | | | |
|---|---|---|---|---|
| 4,682,159 A | * | 7/1987 | Davison ..................... | 345/158 |
| 4,812,829 A | * | 3/1989 | Ebina et al. ................ | 345/145 |
| 5,396,590 A | * | 3/1995 | Kreegar .................... | 345/437 X |
| 5,481,622 A | * | 1/1996 | Gerhardt et al. ........ | 345/158 X |
| 5,512,919 A | * | 4/1996 | Araki ..................... | 345/158 X |
| 5,537,523 A | * | 7/1996 | Harashima et al. ......... | 345/326 |
| 5,588,098 A | * | 12/1996 | Chen et al. ................. | 345/437 |
| 5,590,062 A | * | 12/1996 | Nagamitsu et al. ......... | 345/326 |
| 5,977,935 A | * | 11/1999 | Yasukawa et al. ............ | 345/8 |

FOREIGN PATENT DOCUMENTS

| | | | | |
|---|---|---|---|---|
| EP | 376679 A2 | | 7/1990 | ............ H04N/1/41 |
| EP | WO9314454 | | 7/1993 | |
| GB | 2173079 | * | 10/1986 | ................. 345/158 |
| GB | 2281838 | | 3/1995 | |
| JP | 59-139433 | * | 8/1984 | ................. 345/158 |
| JP | WO95/05620 | * | 2/1995 | ........... G02B/27/02 |

OTHER PUBLICATIONS

"Virtual Laser For 3D Environments", IBM Technical Disclosure Bulletin, vol. 35, No. 6, Nov. 1992, pp. 226–228.

* cited by examiner

Primary Examiner—Mark Zimmerman
Assistant Examiner—Mano Padmanabhan
(74) Attorney, Agent, or Firm—Fitzpatrick, Cella, Harper & Scinto

(57) ABSTRACT

In an interactive image generation method and apparatus, excellent operability is provided when the operator selects a figure to be operated on from among a plurality of figure units displayed on the picture surface of a display unit. In such a method and apparatus, respective units for measuring the visual point and the direction of the line of sight of the operator observing the display device are provided, and a figure unit displayed at a position viewed by the operator on the picture surface is identified. Accordingly, the operator can be sure of correctly selecting the target figure by a direct operation of looking at the figure, and therefore excellent operability can be obtained.

24 Claims, 16 Drawing Sheets

FIG.7

| SERIAL NUMBER OF FIGURE UNIT DATA | FIGURE TYPE | FIGURE DATA | | | | |
|---|---|---|---|---|---|---|
| 1 | TRIANGLE | COORDINATES OF VERTICES | CONNECTION RELATIONSHIP | COLOR, ETC. | | |
| 2 | CHARACTER STRING | FONT DATA | COORDINATES | CHARACTER SIZE | | |
| 3 | SPHERE | RADIUS | COORDINATES | COLOR | TEXTURE, ETC. | |
| 4 | FREE CURVED SURFACE | CONTROL POINT | COLOR | TEXTURE, ETC. | | |
| ... | | | | | | |

INTERACTIVE IMAGE GENERATION METHOD AND APPARATUS UTILIZING A DETERMINATION OF THE VISUAL POINT POSITION OF AN OPERATOR

BACKGROUND OF THE INVENTION

1. Field of the Invention

This invention relates to an image generation method and apparatus. More particularly, the invention relates to an interactive image generation method and apparatus in which a computer interprets geometrical graphic data relating to fonts, plane figures, stereoscopic shapes and the like, attribute data relating to colors, patterns and the like, and scene description data, such as data relating to illumination, data relating to projection, and the like, and in which respective scene data are changed in accordance with interactive operation instructions of the operator, new images are calculated and generated with a short time interval of at least a few frames per second, and the displayed picture surface is sequentially updated.

2. Description of the Related Art

In conventional interactive image generation apparatuses, when the operator selects a figure whose position, posture and other attributes are to be changed, from among a plurality of figures defined in a three-dimensional virtual space and displayed on the picture surface of a display device, the operator designates the figure by manually operating a mouse or any other three-dimensional input device, and moving a three-dimensional index displayed in the space where the figure is defined to the position of the target figure.

At that time, in the above-described conventional method, since there is a deviation between the amount and the direction of movement when the operator manually operates an input device in an actual three-dimensional space, and the operator's visual spatial sense of the amount and the direction of movement of the three-dimensional index in the virtual space displayed on the picture surface, the operation of designating the target figure is generally performed by trial and error.

Furthermore, since it is difficult to recognize the spatial relationship between the target figure and the three-dimensional index in the virtual space, the operation of designating the target figure is generally performed by trial and error.

SUMMARY OF THE INVENTION

The present invention has been made in consideration of the above-described problems.

It is an object of the present invention to provide an interactive image generation apparatus in which, when the operator selects a figure whose position, posture and other attributes are to be changed, from among a plurality of figures defined in a three-dimensional virtual space and displayed on the picture surface of a display device, the figure to be selected can be designated by the direction of the operator's line of sight. Hence, a prompt figure selection operation can be performed by a direct action of looking at the figure to be selected without requiring an indirect manual instruction operation.

It is another object of the present invention to provide an interactive image generation method and apparatus having excellent operability when the operator selects a figure whose position, posture and other attributes are to be changed, from among a plurality of figures defined in a three-dimensional virtual space and displayed on the picture surface of a display device.

According to one aspect, the present invention which achieves these objectives relates to an image generation method comprising the steps of obtaining the position of a visual point of an operator, identifying a direction or line of sight along which the operator is looking, identifying a displayed figure intersected by that direction or line of sight, calculating the coordinates of a point where that direction intersects the displayed figure, registering the position obtained in the calculating step as an operating point, performing transformation for information relating to respective coordinates of the displayed figure identified in the object identifying step and the operating point registered in the registering step making the operating point an origin for coordinate transformation, generating an image of a figure based on the information transformed in the transformation step making the position of the visual point obtained in the measuring step an origin for projection, and displaying the image generated in the generating step.

According to another aspect, the present invention which achieves these objectives relates to an image generation apparatus comprising visual-point-position measuring means for obtaining the position of a visual point of an operator, visual-point-direction measuring means for identifying a direction or a line of sight along which the operator is looking, object determination means for identifying a displayed figure crossed by that direction or line of sight, position determination means for calculating the coordinates of a point where the direction or line of sight intersects the displayed figure, operating-point registration means for registering the position obtained by the position determination means, figure-coordinate tranformation means for performing transformation for information relating to respective coordinates of the displayed figure determined by the object determination means, and the operating point registered by the operating-point registration means, making the operating point an origin for coordinate transformation, image generation means for generating an image of a figure based on the information transformed by the figure-coordinate transformation means making the position of the visual point obtained by the visual-point-position measuring means an origin for projection, and display means for displaying the image generated by the image generation means.

According to the above-described configuration, when the operator selects a figure whose position, posture and other attribute are to be changed, from among a plurality of figures displayed on the picture surface of a display device, the figure to be selected can be designated by means of the direction of the operator's line of sight.

The foregoing and other objects, advantages and features of the present invention will become more apparent from the following detailed description of the preferred embodiments taken in conjunction with the acompanying drawings.

BRIEF DESCRIPTION OF THE DRAWINGS

FIG. 6 is a diagram illustrating the positional relationship among the direction of the operator's line of sight, an image display surface, figures, and the like;

FIG. 7 illustrates a list of figure data;

DETAILED DESCRIPTION OF THE PREFERRED EMBODIMENTS

Figure 1:
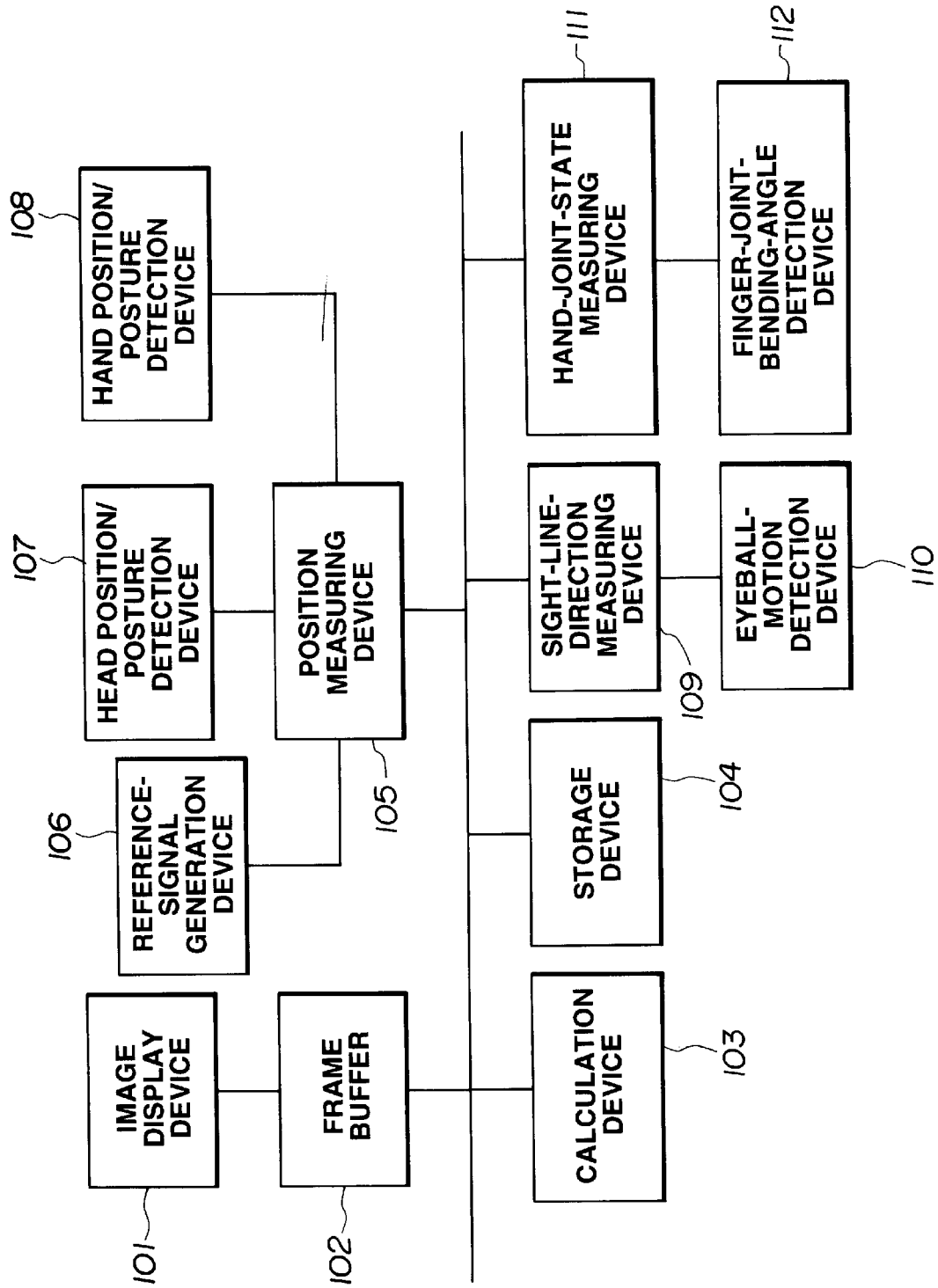
FIG. 1 is a block diagram illustrating the basic configuration of an interactive image generation apparatus according to a first embodiment of the present invention.

A first preferred emodiment of the present invention will now be described in detail with reference to the drawings.

First Embodiment

In an interactive image generation apparatus according to a first embodiment of the present invention, the position and the posture of the operator's head, and the direction of the line of sight of the operator's dominant eye are measured and input using a position/posture detection device mounted on the operator's head and an eyeball-motion detection device mounted in the vicinity of the operator's dominant eye. The position of the start point and the direction of the line of sight of the dominant eye relative to the picture surface of an image display device are calculated based on the above-described information. The geometrical information of the position of the start point is subjected to coordinate transformation into the coordinate system of a three-dimensional space which defines displayed figures.

Then, a displayed figure unit indicated by the direction of the line of sight of the dominant eye is determined.

Then, a three-dimensional position where the direction of the line of sight of the dominant eye intersects the indicated figure unit.

The bending angles of respective finger joints of the operator's hand are measured by finger-joint-bending-angle detection devices mounted on a hand of the operator, and it is determined if a group of bending angles corresponds to a gesture predetermined as a signal indicating execution of instruction to select a figure, for example, a combination of angles for providing a state of "clench the fist" in the present embodiment.

If it is determined that the operator has performed a figure-selection-operation execution gesture, a flag indicating a state of selecting a figure is raised, and the calculated position of the point being looked at is recorded as an operating origin for an operation in a coordinate system having a group of the coordinates of vertices constituting the figure unit indicated by the line of sight. A three-dimensional position/posture measuring device mounted on the hand records the position and the posture of the hand at that time as an initial position of an operation.

In the state of selecting the figure, the position and the posture of the hand are measured by the three-dimensional position/posture measuring device mounted on the hand, the difference between the measured position/posture and the position/posture at the initial position of the operation is obtained, and parallel movement transformation and rotation transformation (taking the difference as the amount of transformation) are performed on the coordinates of vertices constituting the selected figure, and the operating origin, making the operating origin an origin for coordinate transformation.

The image of the entire figure unit is generated making the position of the visual point of the dominant eye an origin of projection based on a perspective projection drawing method, and the image is displayed on the image display device together with a cursor indicating the position of the visual point.

In the figure selection mode, bending angles of the respective finger joints of the operator's hand are measured, and it is determined if a gesture determined in advance to be a signal indicating release of the figure selection mode, for example, a combination of angles for providing a state of "open the fist" in the present embodiment, is performed. If it is determined that the operator has performed the gesture to release the figure selection mode, the flag indicating the figure selection mode is released.

Operations of the image generation apparatus of the first embodiment will now be described in detail.

In FIG. 1, an image display device 101 displays images for the operator, and comprises a CRT (cathode-ray tube) display device, an LCD (liquid-crystal display) device or the like.

A frame buffer 102 stores image data to be displayed on the image display device 101.

A calculation device 103 executes processing in accordance with processing procedures stored in a storage device 104 to generate image data, and controls respective devices. Image data generated by the calculation device 103 is stored in the frame buffer 102.

The storage device 104 stores processing procedures of the calculation device 103 and information necessary for processing, and also provides storage regions for calculation operations required for the processing of the calculation device 103.

The storage device 104 stores control programs for the flowchart shown in FIG. 5 (to be described later), data relating to figures to be depicted, and data necessary for processing.

A position measuring device 105 analyzes signals from a head position/posture detection device 107 and signals from a hand position/posture detection device 108, and input information relating to the position and the posture of the operator's head, and the position and the posture of the operator's hand relative to a reference-signal generation device 106 reference.

The reference-signal generation device 106 generates a signal which serves as reference for the head position/ posture detection device 107 and the hand position/posture detection device 108.

The head position/posture detection device 107 detects the position and the posture of the operator's head, and is fixed to the head using a cap, a band or the like.

The hand position/posture detection device 108 detects the position and the posture of the operator's hand used for operations, and is fixed to the back of the hand, the wrist or the like using a band, a glove or the like.

A sight-line-direction measuring device 109 analyzes signals from an eyeball-motion detection device 110, and inputs information relating to the direction of the line of sight relative to the head to the calculation device 103.

The eyeball-motion detection device 110 detects the direction of the visual line of the eyeball of the operator's dominant eye, and is mounted at a position in front of the dominant eye, where the field of view of the dominant eye in the forward direction is not obstructed, on a spectacle frame or the like.

A hand-joint-state measuring device 111 analyzes signals from finger-joint-bending-angle detection devices 112, and inputs information relating to the bending angle of each finger joint of the operator's hand to the calculation device 103.

The finger-joint-bending-angle detection devices 112 are mounted on main portions of respective finger joints of the operator's hand used for operations of the operator using a glove or the like.

Figure 2:
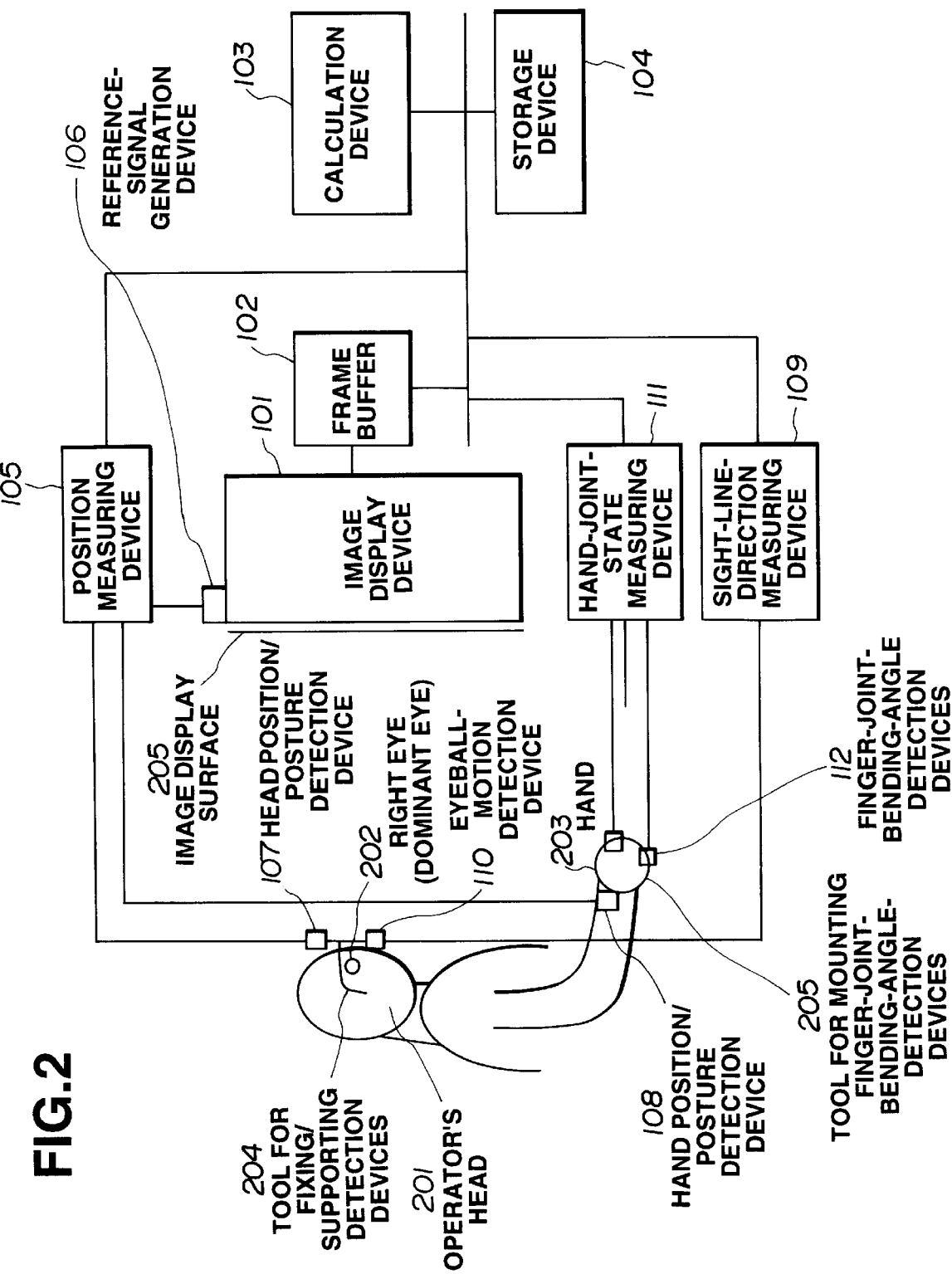
FIG. 2 is a schematic diagram illustrating the arrangement of detection devices constituting the interactive image generation apparatus shown in FIG. 1.

As shown in FIG. 2, the reference-signal generation device 106 is fixed to an upper portion of the image display device 101. The reference-signal generation device 106 may be disposed according to any other method for fixing it relative to the image display device 101. For example, the reference-signal generation device 106 may be fixed on a base for fixing the image display device 101.

The head position/posture detection device 107 and the eyeball-motion detection device 110 are fixed to the operator's head using a tool 204 having the shape of a spectacle frame. The eyeball-motion detection device 110 is mounted at a position in front of the eyeball of the operator's dominant eye where the field of view in the forward direction is not obstructed, using the tool 204 for fixing/supporting detection devices.

Figure 3:
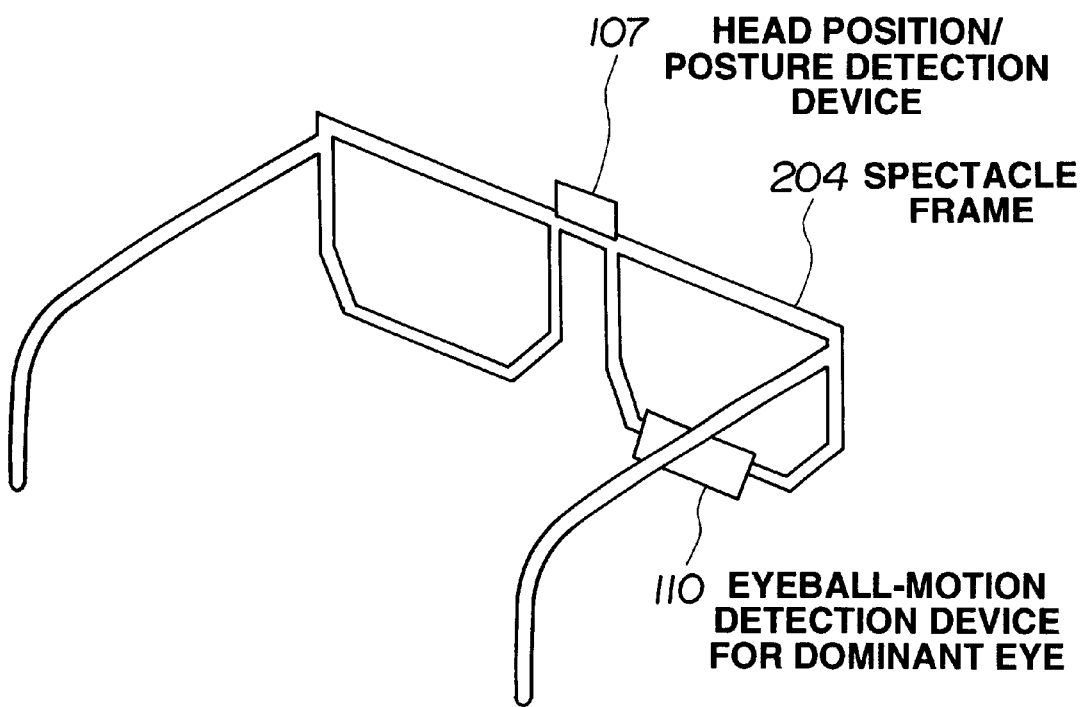
FIG. 3 is a diagram illustrating the configuration of a tool 204 for fixing/supporting detection devices shown in FIG. 2.
Figure 4:
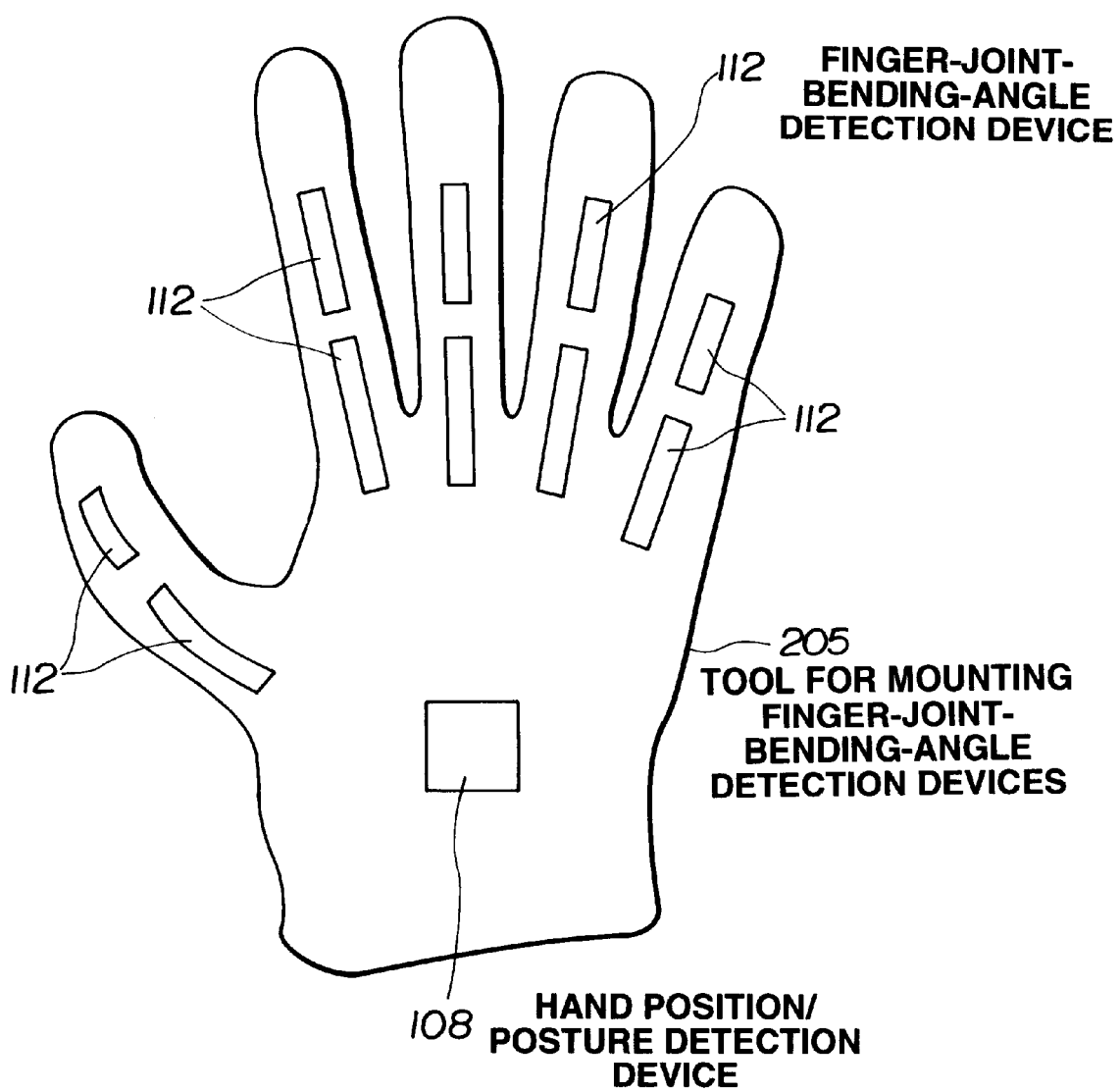
FIG. 4 is a diagram illustrating the configuration of a tool 205 for mounting finger-joint-bending-angle detection devices shown in FIG. 2.

FIG. 3 illustrates the configuration of the tool 204 for fixing/supporting detection devices. FIG. 4 illustrates a tool 205 for mounting finger-joint-bending-angle detection devices.

Returning to FIG. 2, the finger-joint-bending-angle detection devices 112 are fixed on main portions of the respective finger joints of the operator's hand 203 using the tool 205, havin the shape of a glove, for mounting finger-joint-bending-angle detection devices. The hand position/posture detection device 108 is also fixed to the back of the operator's hand using the mounting tool 205. The hand position/posture detection device 108 may be fixed to the wrist of the operator's hand using a strap.

The other devices are arranged at arbitrary appropriate positions.

Figure 5:
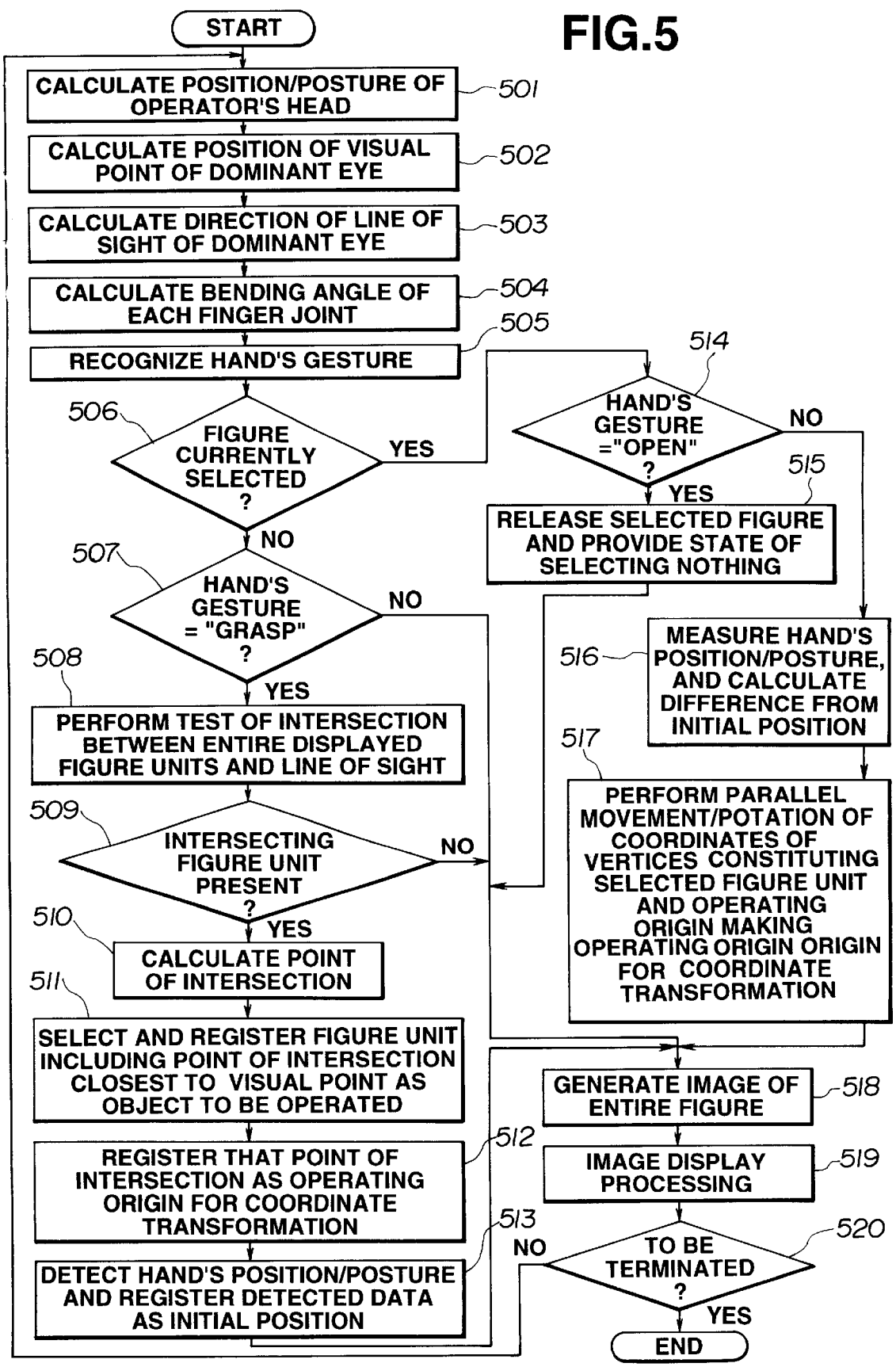
FIG. 5 is a flowchart illustrating the flow of image generation processing in the first embodiment.

FIG. 5 is a flowchart illustrating the flow of image generation processing in the first embodiment.

The details of the processing in respective steps will now be sequentially described.

First, in step 501, the position measuring device 105 measures the position and the posture of the head position/posture detection device 107 relative to the position and the posture of the reference-signal generation device 106. Information relating to the coordinates of the position and the posture of the head position/posture detection device 107 is subjected to coordinate transformation into the coordinate system which defines the displayed figures, to provide information relating to the coordinates of the position and the posture of the operator's head.

In step 502, the position of the visual point of the operator's dominant eye 202 in the coordinate system which defines the figure data is calculated. The coordinate values of the position of the visual point of the dominant eye 202 relative to the position and the posture of the head position/posture detection device 107 are stored in advance as offset values, and the position of the visual point of the dominant eye 202 is determined by adding these offset values to the coordinates of the position of the head position/posture detection device 107 obtained in step 501.

Figure 6:
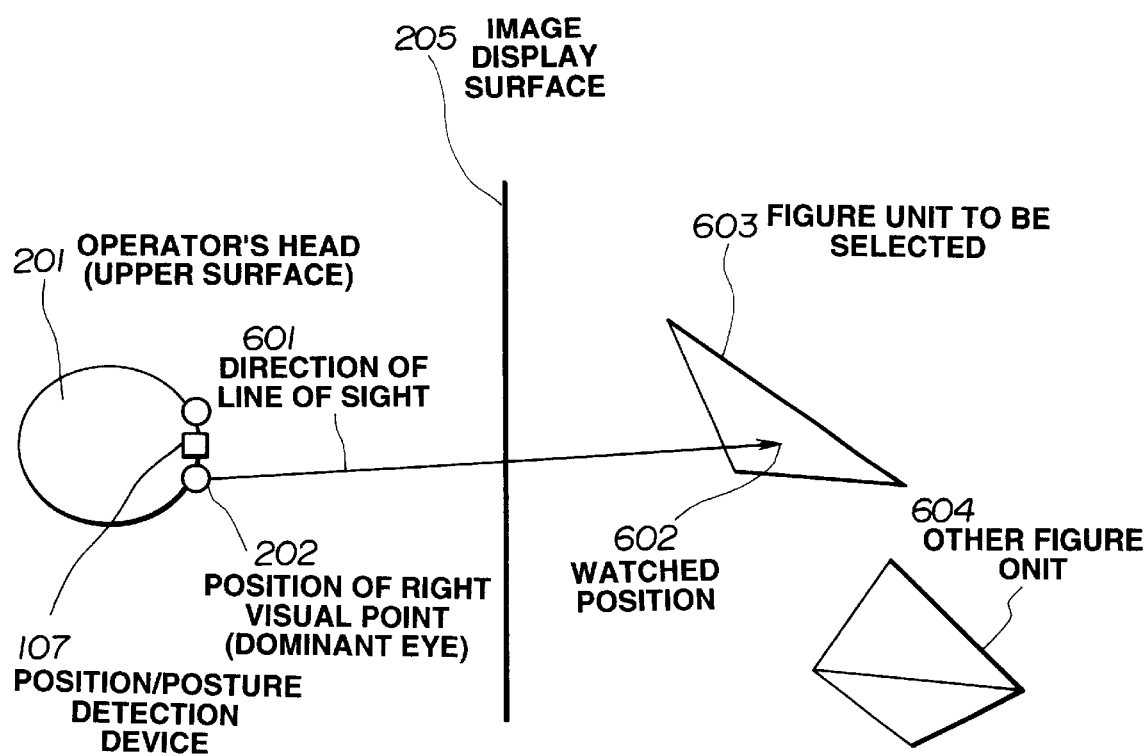

In step 503, the direction of the line of sight in the coordinate system which defines the figure data is calculated based on vector information obtained by analyzing a signal from the eyeball-motion detection device 110 by the sight-line-direction measuring device 109 and information relating to the posture of the operator's head obtained in step 501. FIG. 6 illustrates the positional relationship among the direction of the operator's line of sight, the image display surface, figures and the like.

In step 504, signals from the finger-joint-bending-angle detection devices 112 mounted on the finger joints of the hand are analyzed by the hand-joint-state measuring device 111, and the bending angles of the respective finger joints are measured.

In step 505, the currently performed gesture is determined from the combination of the bending angles of the respective finger joints.

If a figure to be operated is not currently selected in step 506, it is then determined in step 507 if the hand's gesture corresponds to a "clench" of the fist, as if grasping.

If the result of the determination in step 507 is affirmative, it is determined that the operator has instructed to select a figure to be operated on, and processing of selecting the figure to be operated on, from step 508 to step 513, is executed.

In step 508, a test of intersection between the line of sight and the displayed figures is performed. In this test of intersection, it is calculated whether or not a point of intersection between a curved surface or a flat surface constituting a figure unit, and a half line indicating the line of sight, is present. The data of figure units are stored in a figure-data list, for example, in the form shown in FIG. 7. The items of respective figure data in the data list comprise, the identification number of each figure data, the kind of each figure, geometrical data of each figure, and the like.

In step 509, it is determined if an intersecting figure unit is present. If the result of the determination is affirmative, in step 510, the coordinates of the point of intersection between a curved surface or a flat surface constituting the intersecting figure, and the line of sight, are obtained.

In step 511, the figure unit including the point of intersection which is closest to the visual point is registered as the object to be operated on.

In step 512, the point of intersection closest to the visual point is registered as an operating point for coordinate transformation.

In step 513, the position/posture measuring device 105 measures the position and the posture of the hand based on a signal from the hand position/posture detection device 108, and the position and the posture at that time are registered as an initial position for an operation.

If a figure which is currently selected as an object to be operated on is present in step 506, it is determined in step 514 if the hand's gesture corresponds to "open the fist". If the result of the determination is affirmative, it is determined that the operator has instructed to terminate the operation of selecting the figure, and a state of selecting nothing is provided by releasing the selected figure.

If the result of the determination in step 514 is negative, the position and the posture of the hand are measured by the hand position/posture measuring device 108, the reference-signal generation device 106 and the position/posture measuring device 105, and the difference from the initial position registered in step 513 is calculated.

In step 517, the coordinates of vertices of flat surfaces and the coordinates of control points of curved surfaces constituting the figure unit selected and registered as the object to be operated, and the position of the operating point are subjected to parallel movement transformation and rotation movement transformation by the difference in the position and the posture obtained in step 516 making the registered operating origin an origin of coordinate transformation, and the coordinate values are replaced by new coordinate values after transformation.

In step 518, the image of the entire figure unit is generated making the position of the visual point obtained in step 502 an origin of projection according to the perspective drawing projection method, and the generated image is stored in the frame buffer 102. The image of a small cross-shaped figure, serving as an index indicating the direction of the line of sight, is generated at the position where the direction of the line of sight intersects the figure unit on the picture surface of the display device. (This index may have any other shape).

In image display processing of step 519, the image stored in the frame buffer 102 is displayed on the image display device 101.

In step 520, it is determined if an instruction to terminate the image generation processing from the operator is present. If the result of the determination is negative, the processing from step 501 is repeated. If the result of the determination is affirmative, the processing is terminated.

By thus directing the direction of the line of sight toward an object to be selected and performing instruction to execute selection of a figure by the hand's gesture, a figure to be operated on can be promptly selected.

Second Embodiment

A description will now be provided of a second embodiment of the present invention.

In the first embodiment, a figure to be selected as an object to be operated on is indicated according to the direction of the operator's line of sight, and an operation of selecting a figure is executed according to the hand's gesture. In the second embodiment, however, the operator's voice is recognized, and selection of a figure is executed according to a voice instruction of the operator.

Figure 8:
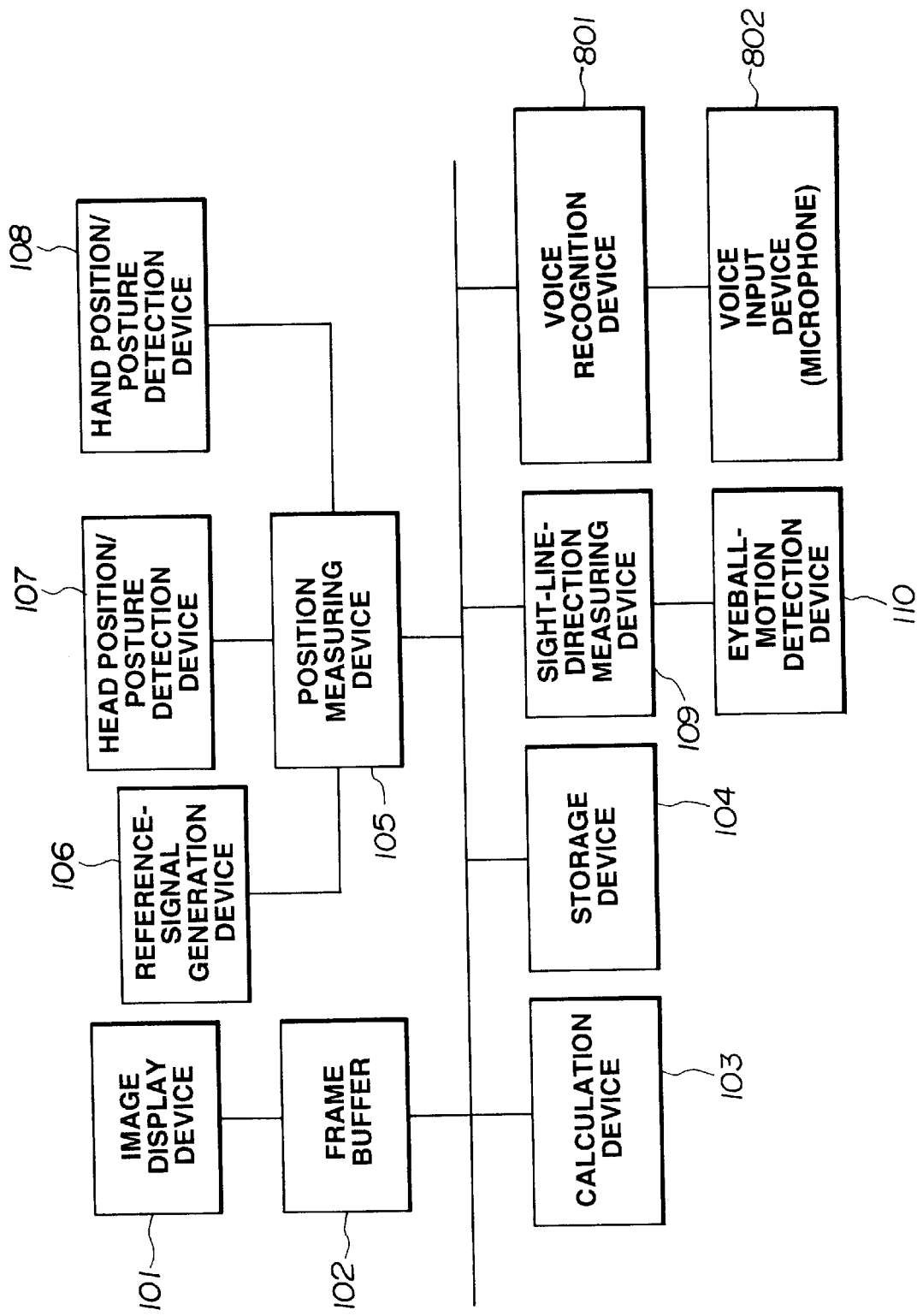
FIG. 8 is a block diagram illustrating the basic configuration of an interactive image generation apparatus according to a second embodiment of the present invention.

The basic configuration of the second embodiment is shown in FIG. 8.

FIG. 8 is a block diagram illustrating the basic configuration of an interactive image generation apparatus according to the second embodiment.

The basic configuration of the second embodiment differs from that of the first embodiment in that the finger-joint-bending-angle detection devices 112 and the hand-joint-state measuring device 111 of the first embodiment are removed and, instead, a voice input device 802 and a voice recognition device 801 are provided.

The voice input device 802 is a device for obtaining a voice signal from the operator, and comprises a microphone or the like.

The voice recognition device 801 is a device for recognizing a voice instruction of the operator. The voice recognition device 801 analyzes a voice signal input from the voice input device 802, and inputs character information indicating the contents of the voice to a calculation device 103.

Figure 9:
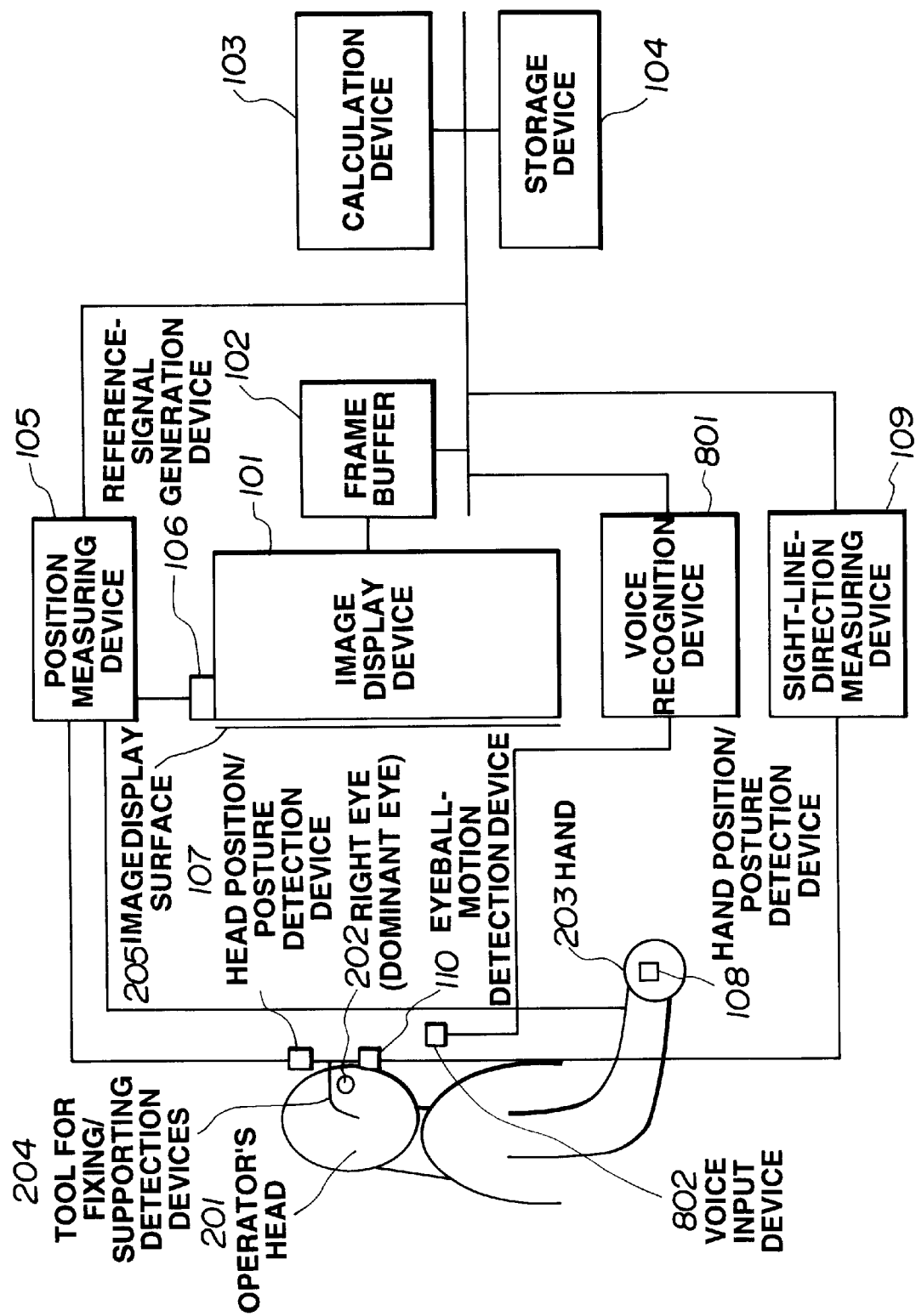
FIG. 9 is a schematic diagram illustrating arrangement of detection devices constituting the interactive image generation apparatus shown in FIG. 8.

As shown in FIG. 9, the voice input device 802 is disposed at a position where the operator's voice can be easily input. A hand position/posture detection device 108, rather than being fixed to the hand as in the first embodiment, may instead be held in the operator's hand.

Figure 10:
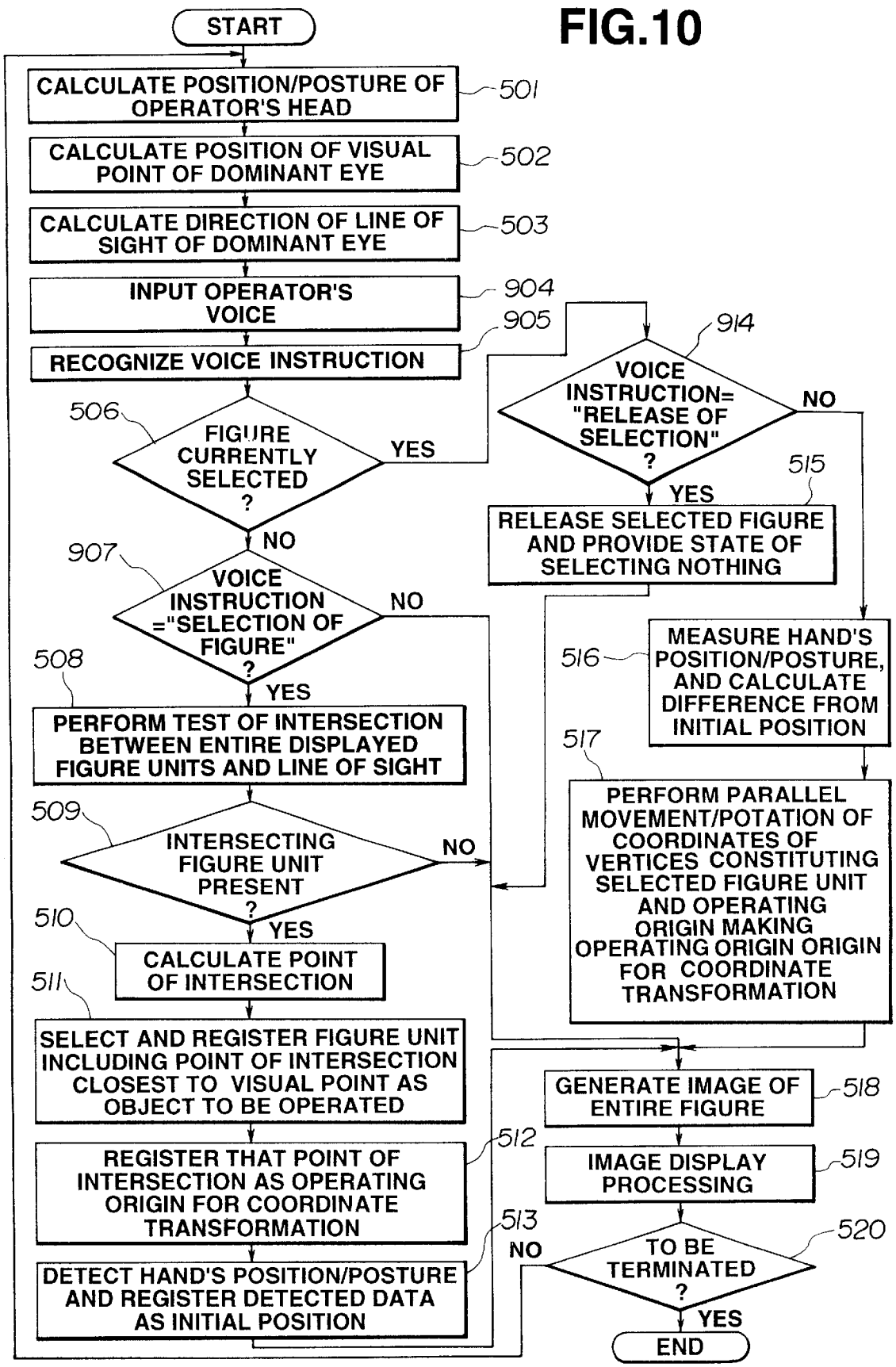
FIG. 10 is a flowchart illustrating the flow of image generation processing in the second embodiment.

FIG. 10 is a flowchart illustrating the flow of image generation processing in the second embodiment.

Although the flow of the image generation processing in the second embodiment is substantially the same as the processing in the first embodiment, the processing differs from that of the first embodiment in steps 904, 905, 907 and 914.

In step 904, a voice signal from the voice input device 802 is input. In step 905, the voice signal is analyzed and is converted into character-string information indicating the contents of the voice.

In step 907, if the voice's instruction is "selection of a figure", it is determined that the selection of a figure has been instructed. (The voice instruction which is registered in advance in voice recognition device 801 for this purpose may be any other instruction than "selection of a figure"). In step 914, if the contents of the voice instruction indicate "release of selection", it is detemined that release of selection of the figure has been instructed. Again, the voice instruction which is registered in advance for this purpose may be any other instruction than "release of selection".

Third Embodiment

Next, a description will be provided of a third embodiment of the present invention.

In the first embodiment, a figure to be selected as an object to be operated on is indicated according to the direction of the line of sight, and an operation of selecting a figure is executed according to the hand's gesture. In the third embodiment, however, the operator checks the state of a push button switch held in his or her hand, and selection of a figure is executed when the operator depresses the push button switch.

Figure 11:
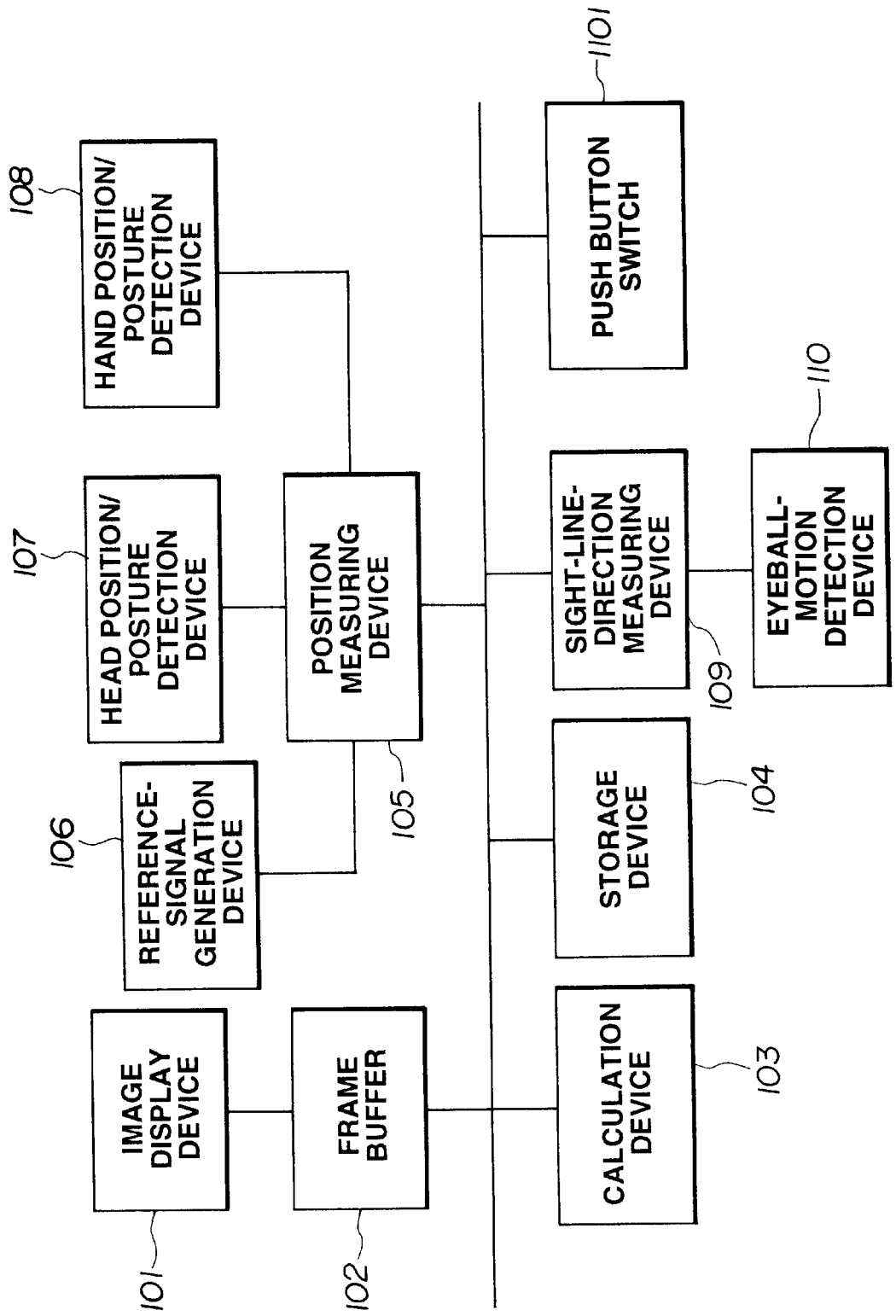
FIG. 11 is a block diagram illustrating the basic configuration of an interactive image generation apparatus according to a third embodiment of the present invention.

The basic configuration of the third embodiment is shown in FIG. 11.

The basic configuration of the third embodiment differs from that of the first embodiment in that the finger-joint-bending-angle detection devices 112 and the hand-joint-state measuring device 111 of the first embodiment are removed and, instead, a push button switch 1101 is provided.

The operator inputs one of two states, i.e., an on-state and an off-state, to a calculation device 103 by operating the push button switch 1101.

Figure 12:
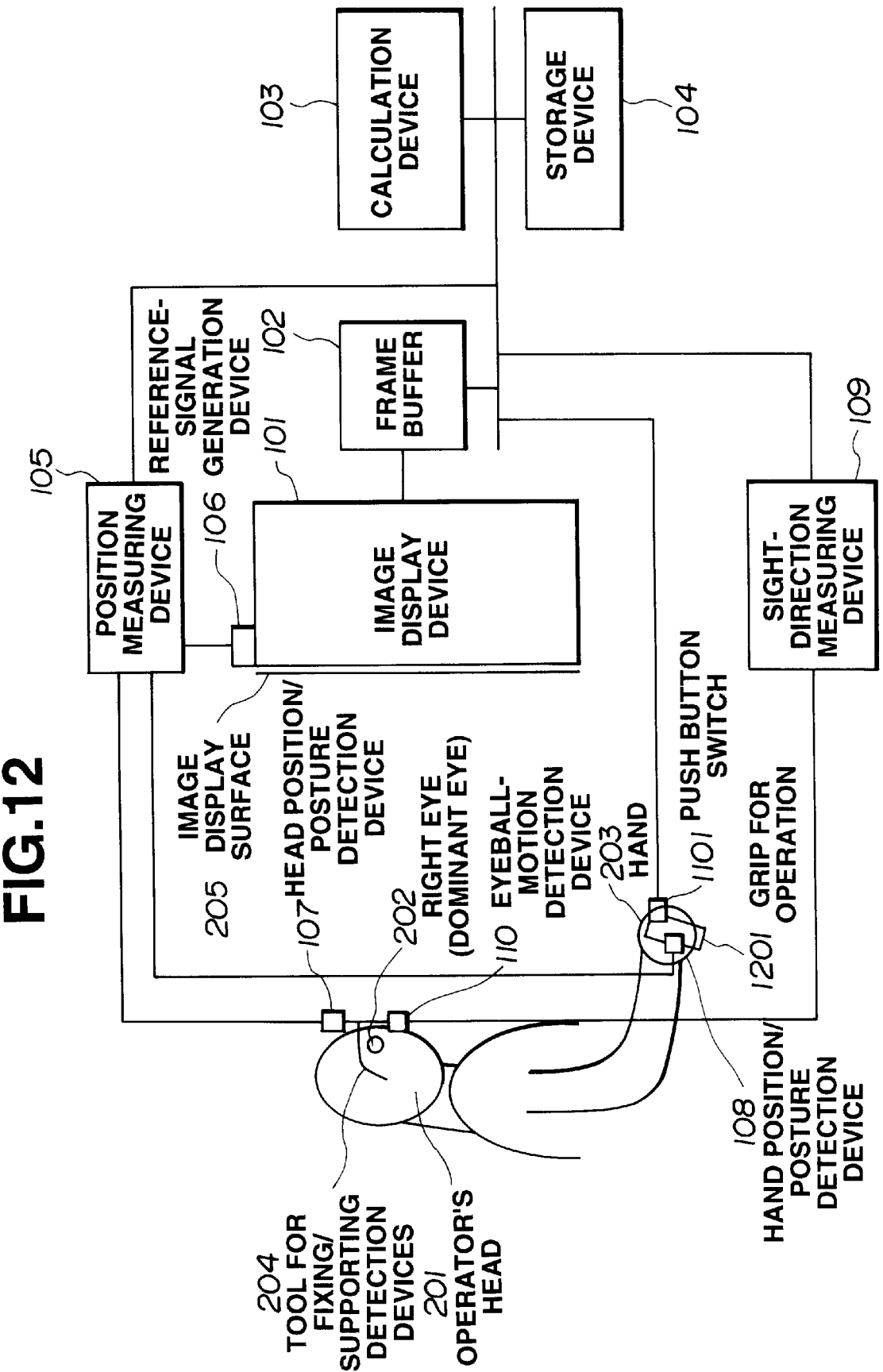
FIG. 12 is a schematic diagram illustrating arrangement of detection devices constituting the interactive image generation apparatus shown in FIG. 11.
Figure 13:
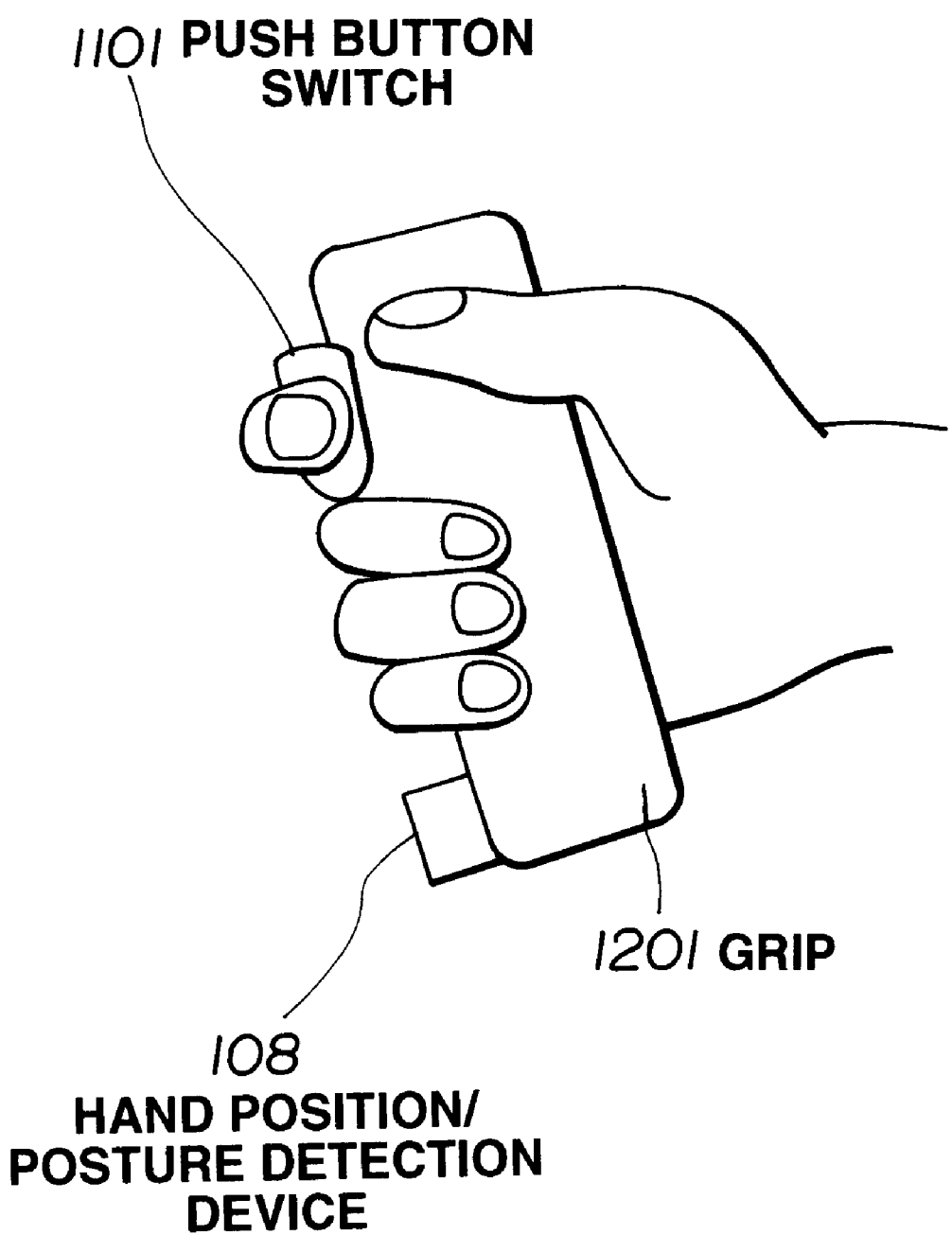
FIG. 13 is a diagram illustrating a grip for operation 1201 shown in FIG. 12.

FIG. 12 is a schematic diagram illustrating detection devices constituting the interactive image generation apparatus of the third embodiment, and differs from the corresponding illustration of the first embodiment in the respects just mentioned. As shown in FIG. 13, the push button switch 1101 and a hand position/posture detection device 108 are fixed on a grip 1201 grasped by the operator. The push button switch 1101 and the hand position/posture detection device 108 may be held separately by the right hand and the left hand.

Figure 14:
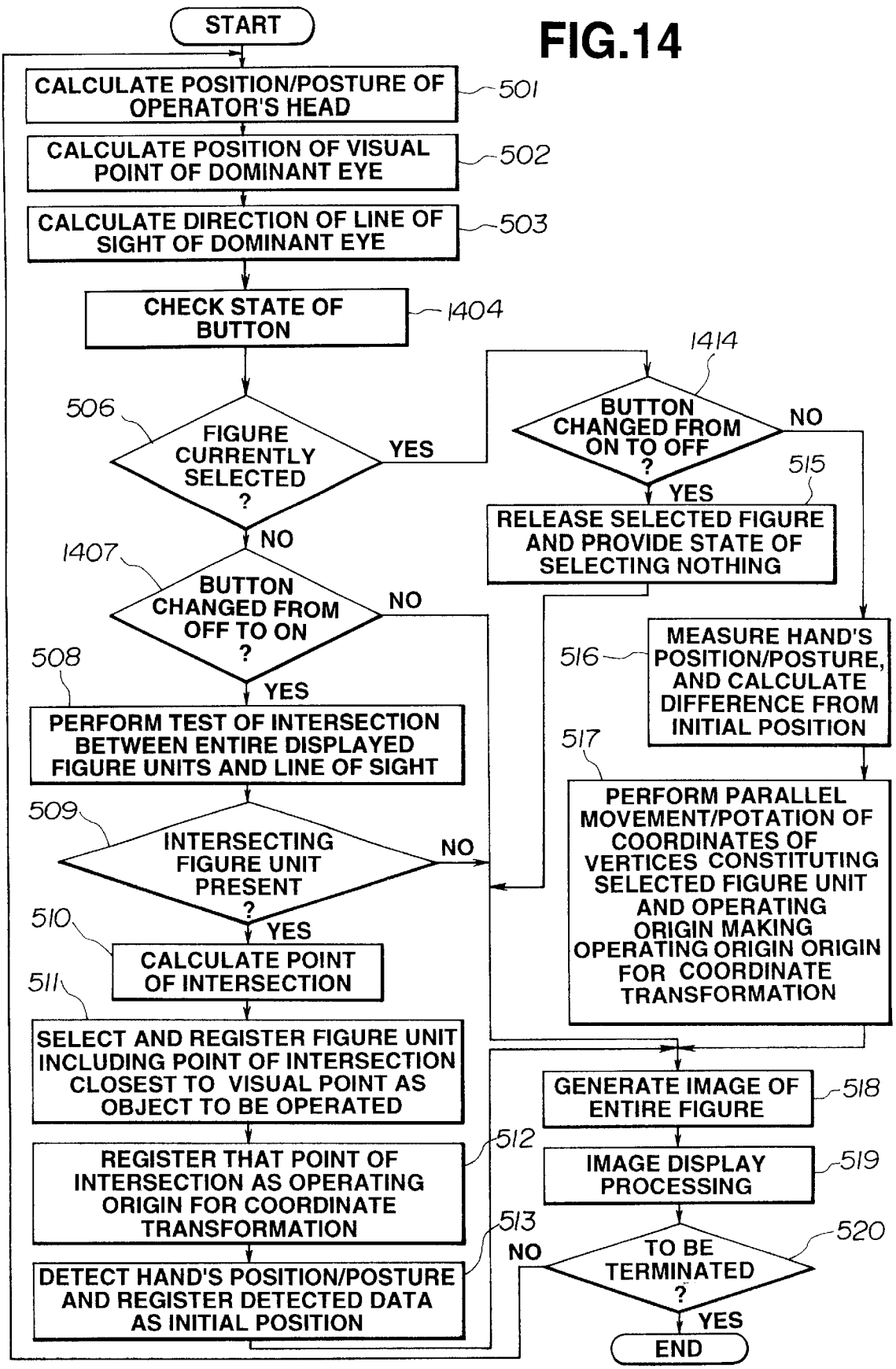
FIG. 14 is a flowchart illustrating the flow of image generation processing in the third embodiment.

FIG. 14 is a flowchart illustrating the flow of image generation processing in the third embodiment.

Although the flow of the image generation processing in the third embodiment is substantially the same as the processing in the first embodiment, the processing differs from that of the first embodiment in steps 1404, 1407 and 1414.

In step 1404, the state of the push button switch 1101 is checked. In step 1407, if the state of the push button switch 1101 has changed from the off-state to the on-state, it is determined that selection of a figure has been instructed. In step 1414, if the state of the push button switch 1101 has changed from the on-state to the off-state, it is determined that release of selection of a figure has been instructed.

Fourth Embodiment

Next, a description will be provided of a fourth embodiment of the present invention.

In the first embodiment, the direction of the operator's line of sight is measured using the eyeball-motion detection device 110 and the sight-line-direction measuring device 109. In the fourth embodiment, however, the forward direction of the head measured by the head position/posture detection device 107, the position measuring device 105 and the reference-signal generation device 106 is used as alternate information for the direction of the line of sight.

Figure 15:
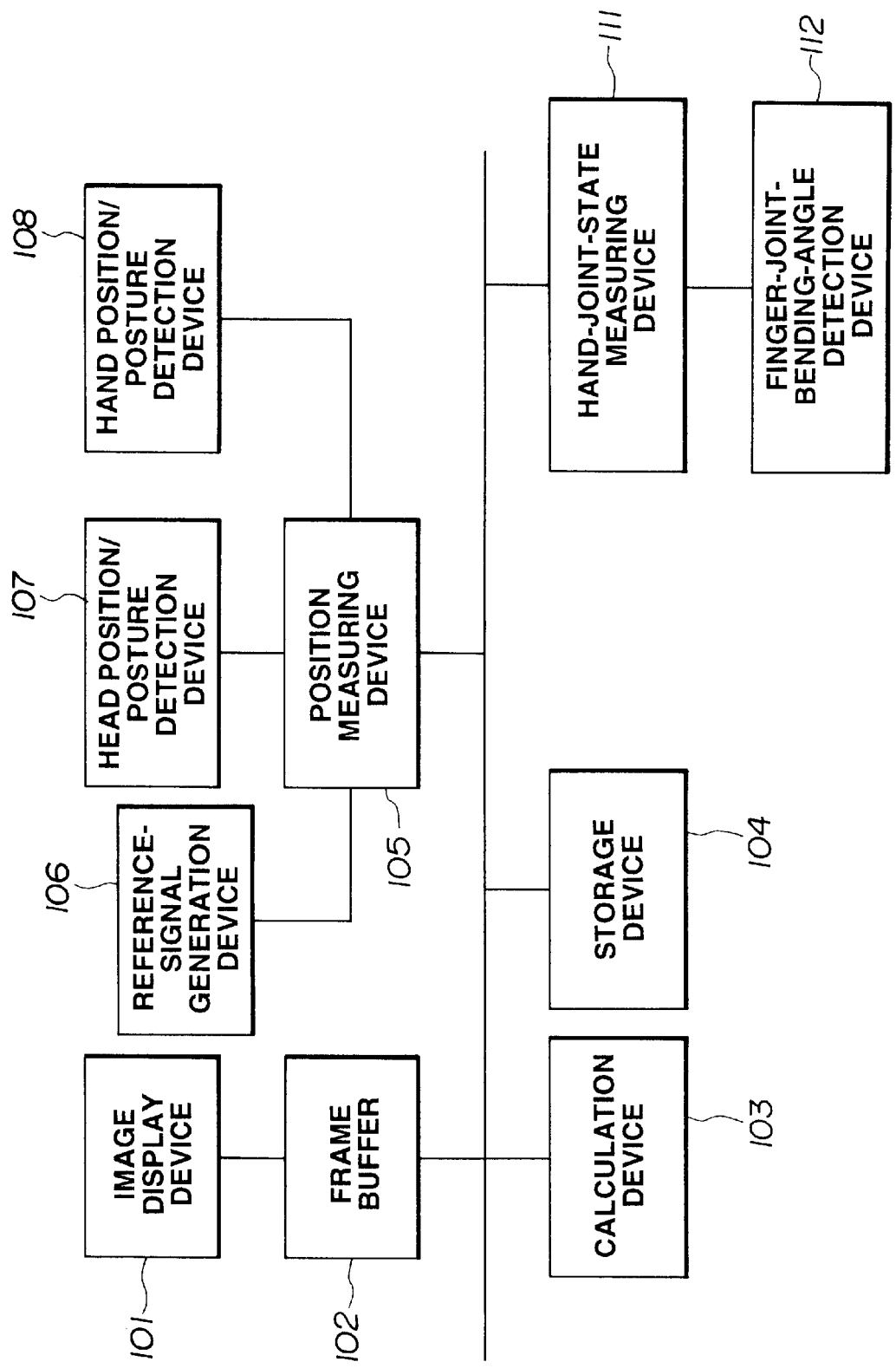
FIG. 15 is a block diagram illustrating the basic configuration of an interactive image generation apparatus according to a fourth embodiment of the present invention.

The basic configuration of the fourth embodiment is shown in FIG. 15.

The basic configuration of the fourth embodiment differs from that of the first embodiment in that the eyeball-motion detection device 110 and the sight-line-direction measuring device of the first embodiment are removed.

Figure 16:
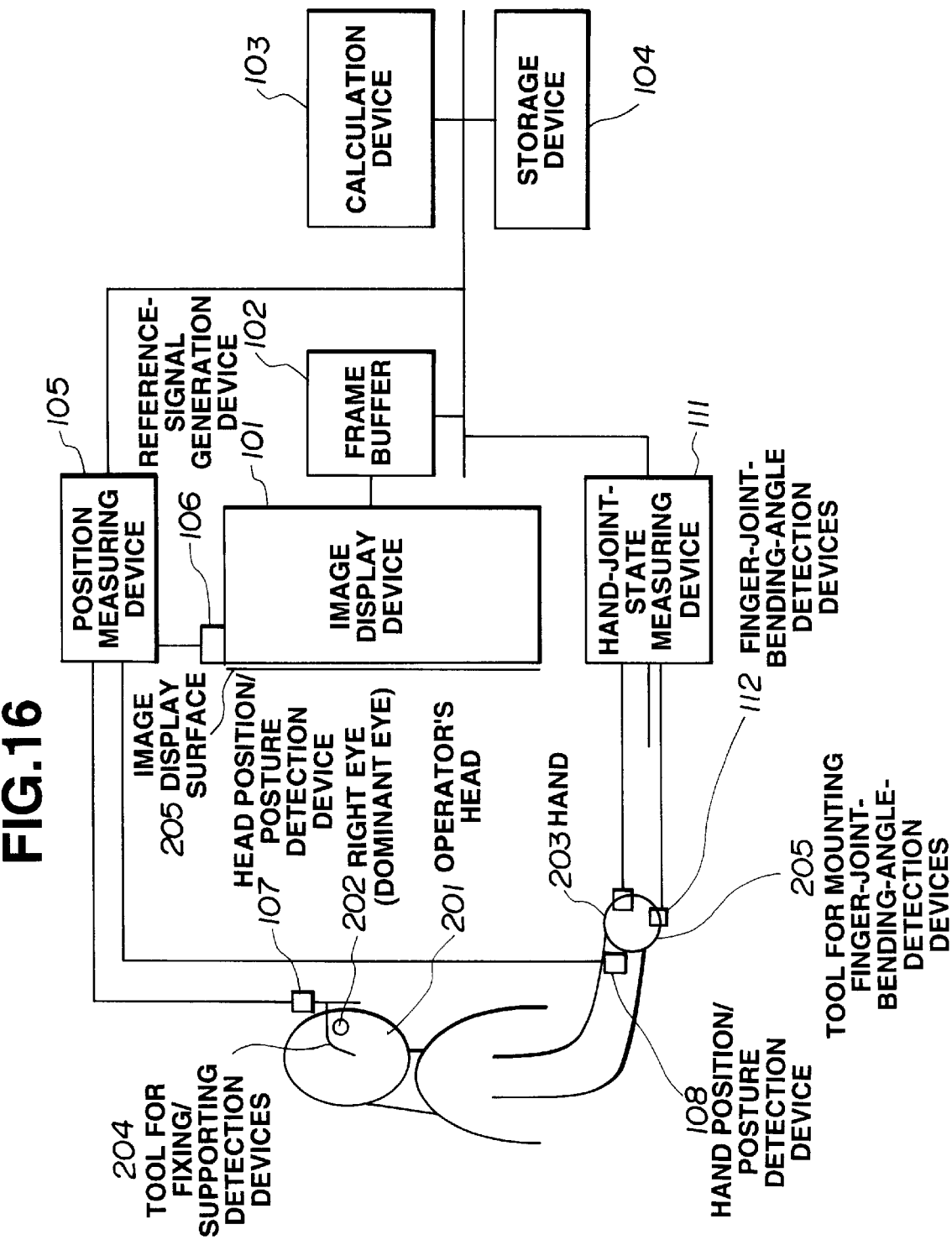
FIG. 16 is a schematic diagram illustrating arrangement of detection devices in the fourth embodiment.

FIG. 16 illustrates the arrangement of detection devices in the fourth embodiment, which differs from the arrangement of the devices in the previous embodiments in the manner just stated.

The flow of image generation/display processing in the fourth embodiment is represented by FIG. 5, as in the first embodiment. The details of the processing in all steps except step 503 are the same as in the processing of the first embodiment.

In step 503 of the fourth embodiment, the approximation is made that the line of sight of the dominant eye is always directed in the forward direction of the head, and the vector of the foward direction derived from the posture of the head obtained in step 501 is used for the sight-line vector.

As described above, according to the foregoing embodiments, when, in an interactive image generation apparatus, the operator selects a figure whose position, posture and other attribute are to be changed from among a plurality of figures defined in a three-dimensional virtual space and displayed on the picture surface of a display device, the figure to be selected can be instructed by the direction of the operator's line of sight. Hence, by the direct motion of the operator's looking at the figure to be selected, a prompt figure selection operation can be performed without requiring an indirect manual instruction operation.

The individual components shown in outline or designated by blocks in the drawings are all well known in the interactive image generation method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image generation method comprising the steps of:
    displaying a figure data expressed in first three-dimensional coordinates on a display screen;
    measuring a position of an operator's head in second three-dimensional coordinates;
    providing an instruction specifying that a three-dimensional figure be selected;
    converting the second three-dimensional coordinates into the first three-dimensional coordinates;
    identifying a line-of-sight direction along which the operator is looking in the converted second three-dimensional coordinates;
    identifying a displayed three-dimensional figure in the first three-dimensional coordinates intersected by the identified direction in response to the instruction based on the position of the operator's head in the converted second three-dimensional coordinates and the direction of the line-of-sight;
    calculating coordinates of a closest point; and
    registering the closest point obtained in said calculating step as an operating point.

2. A method according to claim 1, wherein, in said position measuring step and said direction identifying step, the position of the point and the direction are measured, respectively, for a dominant eye of the operator.

3. A method according to claim 1, wherein, in said direction identifying step, the forward direction of the operator's head is approximated as the direction along which the operator is looking.

4. An image generation method according to claim 1, further comprising the steps of:
    coordinate transforming information relating to respective coordinates of the displayed figure identified in said identifying step and the operating point registered in said registering step, using the operating point as an origin for the coordinate transformation;
    generating an image of a figure based on transformed information produced in said transforming step, using the position of the point measured in said measuring step as an origin for projection; and
    displaying the image generated in said generating step.

5. A method according to claim 4, further comprising the step of determining whether or not the operator has issued an instruction to register the position calculated in said calculating step as the origin for the coordinate transformation in said transforming step, wherein said registrating step includes registering the position based on the determination made in said determining step.

6. A method according to claim 5, wherein said determining step further comprises the steps of:
    detecting bending angles of respective finger joints of a hand of the operator; and determining whether or not the bending angle of each of the finger joints is within a preset angle range, wherein, when the finger joints have been determined to be in a specific state in said finger-joint-state determining step, it is determined that an instruction to register the position calculated in said calculating step as the operating point, has been performed.

7. A method according to claim 5, wherein said determining step further comprises the steps of:

inputting a voice instruction given by the operator; and recognizing the voice instruction input in said inputting step, wherein, when it has been determined that the voice instruction recognized in said recognizing step is the same as a preset voice instruction indicating instruction of registration, it is determined that an instruction has been given to register the position calculated in said calculating step as the operating point.

8. A method according to claim 4, wherein said displaying step includes displaying a figure which serves as an index while superposing it on the image generated in said generating step at the position calculated in said calculating step.

9. An image generation apparatus comprising:

a display device, arranged to display a figure data expressed in first three-dimensional coordinants on a display screen;

a visual-point-position measurer, arranged to obtain a position of an operator's head in second three-dimensional coordinates;

an instructor, arranged to provide an instruction specifying that a three dimensional figure be selected;

a converter, arranged to convert the second three-dimensional coordinates into the first three-dimensional coordinates;

a line-of-sight direction measurer, arranged to identify a direction along which the operator is looking in the converted second three-dimensional coordinates;

an object determiner, arranged to identify a displayed three-dimensional figure in the first three-dimensional coordinates intersected by the identified direction in response to the instruction of the instructor based on the position of the operator's head in the converted second three-dimensional coordinates and the direction of the line of sight;

an operating-point registerer, arranged to register a position as an operating point;

a figure-coordinate transformation processor, arranged to perform a coordinate transformation on information relating to respective coordinates of the displayed figure identified by said object determiner, and the operating point registered by said operating-point registerer, using the operating point as an origin for the coordinate transformation;

an image generator, arranged to generate an image of a figure based on the transformed information provided by said figure-coordinate transformation processor, using the position of the visual point obtained by said visual-point-position measurer as an origin for projection; and an image display arranged to display the image generated by said image generator.

10. An apparatus according to claim 9, wherein said sight-line-direction measurer approximates the forward direction of the operator's head as the direction of the line of sight.

11. A figure designation apparatus comprising:

a display arranged to display figure data expressed in first three-dimensional coordinates on a display screen for a plurality of three-dimensional figures;

a memory, arranged to store coordinate information of each of said plurality of three-dimensional figures;

a visual-point-direction measurer, arranged to obtain coordinates of a position of an operator's head in second three-dimensional coordinates;

an instructor, arranged to provide an instruction that a three-dimensional figure be selected;

a convertor, arranged to convert the second three-dimensional coordinates into the first three-dimensional coordinates;

a line-of-sight direction measurer, arranged to identify a line-of-sight direction along which the operator is looking in the converted second three-dimensional coordinates;

an adjuster, arranged to adjust, in response to the instruction provided by the instructor, the coordinates of the figures displayed on said display and the coordinates of a position based on the position of the operator's head in the converted second three-dimensional coordinates and the direction of the line-of sight; and a selector, arranged to select one of the figures displayed on said display on the basis of the coordinates adjusted by said adjuster and said direction of the line-of-sight.

12. An apparatus according to claim 11, wherein said visual-point-direction measurer and said line-of sight-direction measurer measure the position of the visual point and the direction, respectively, for a dominant eye of the operator.

13. An apparatus according to claim 11, wherein said line-of-sight-direction measurer approximates a forward direction of the operator's head as the direction of the line-of-sight.

14. An apparatus according to claim 11, further comprising an instruction recognizer, arranged to determine whether or not the operator has issued an instruction to register the position obtained by said visual-point-direction measurer as the coordinates to be adjusted by said adjuster.

15. An apparatus according to claim 14, wherein said instruction recognizer further comprises:

an angle measurer, arranged to detect bending angles of respective finger joints of a hand of the operator; and a hand-joint-state determiner for determining whether or not the bending angle of each of the finger joints is within a preset angle range, wherein, when the finger joints have been determined to be in a specific state by said finger-joint-state determiner, it is determined that an instruction has been given to register the position obtained by said visual-point-position measurer.

16. An apparatus according to claim 14, wherein said instruction recognizer further comprises:

a voice inputter, arranged to input a voice instruction issued by the operator; and a voice recognizer, arranged to recognize the voice instruction input by said voice inputter, wherein when it has been determined that the voice instruction recognized by said voice is the same as a preset voice instruction indicating an instruction for registration, it is determined that an instruction has been given to register the position obtained by said visual-point-direction measurer.

17. A figure designation method comprising the steps of:
displaying a figure data expressed in first three-dimensional coordinates for a plurality of three-dimensional figures on a display;
storing coordinate information of each of the plurality of three-dimensional figures in a memory;
obtaining a position of an operator's head in second three-dimensional coordinates;
providing an instruction;
converting the second three-dimensional coordinates into the first three-dimensional coordinates;
identifying a line-of-sight direction along which the operator is looking in the converted second three-dimensional coordinates;
adjusting, in response to the instruction, the coordinates of the figures displayed on the display and the coordinates of a position based on the position of the operator's head in the converted second three-dimensional coordinates and the direction of the line-of-sight; and
selecting one of the figures displayed on the display on a basis of the coordinates adjusted in said adjusting step and the direction of the line-of-sight.

18. A method according to claim 17, wherein the position of the visual point and the direction of line-of-sight for a dominant eye of the operator are measured in said obtaining step and said identifying step, respectively.

19. A method according to claim 17, wherein said identifying step approximates a forward direction of the operator's head as the direction of the line-of-sight.

20. A method according to claim 19, further comprising the steps of:
detecting bending angles of respective finger joints of a hand of the operator; and
determining whether or not the bending angle of each of the finger joints is within a preset angle range,
wherein, when the finger joints have been determined to be in a specific state in said determining step, it is determined that an instruction has been given to register the position obtained in said obtaining step.

21. An method according to claim 19, further comprising the steps of:
inputting a voice instruction issued by the operator; and
recognizing the voice instruction input in said inputting step,
wherein when it has been determined that the voice instruction recognized in said recognizing step is the same as a preset voice instruction indicating an instruction for registration, it is determined that an instruction has been given to register the position obtained in said obtaining step.

22. A method according to claim 17, further comprising a step for determining whether or not the operator has issued an instruction to register the position obtained in said obtaining step as the coordinates to be adjusted in said adjusting step.

23. A storage medium containing computer readable program comprising code which upon execution will cause an image generation apparatus to perform the steps comprising:
displaying a figure data expressed in first three-dimensional coordinates on a display screen;
measuring a position of an operator's head in second three-dimensional coordinates;
providing an instruction specifying that a three-dimensional figure is to be selected;
converting the second three-dimensional coordinates into the first three-dimensional coordinates;
identifying a line-of-sight direction along which the operator is looking in the converted second three-dimensional coordinates;
identifying a displayed three-dimensional figure in the first three-dimensional coordinates intersected by the identified direction in response to the instruction based on the position of the operator's head in the converted second three-dimensional coordinates and the direction of the line-of sight;
calculating the coordinates of the closest point;
registering the closest point obtained in said calculating step as an operating point;
coordinate transforming information relating to respective coordinates of the displayed figure identified in said identifying step and the operating point registered in said registering step, using the operating point as an origin for the coordinate transformation;
generating an image of a figure based on transformed information produced in said transforming step, using the position of the point measured in said measuring step as an origin for projection; and
displaying the image generated in said generating step.

24. A storage medium containing computer readable program comprising code which upon execution will cause a figure designation apparatus to perform the steps comprising:
displaying a figure data expressed in first three-dimensional coordinates for a plurality of three-dimensional figures on a display;
storing coordinate information of each of the plurality of three-dimensional figures in a memory;
obtaining coordinates of a position of an operator's head in second three-dimensional coordinates;
providing an instruction;
converting the second three-dimensional coordinates into the first three-dimensional coordinates;
adjusting, in response to the instruction, the coordinates of the figures displayed on the display and the coordinates of a position based on the position of the operator's head in the converted second three-dimensional coordinates and the direction of the line-of-sight; and
selecting one of the figures displayed on the display on a basis of the coordinates adjusted in said adjusting step and the direction of the line-of-sight.

* * * * *

UNITED STATES PATENT AND TRADEMARK OFFICE
CERTIFICATE OF CORRECTION

PATENT NO. : 6,437,794 B1
DATED : August 20, 2002
INVENTOR(S) : Toshikazu Ohshima et al.

It is certified that error appears in the above-identified patent and that said Letters Patent is hereby corrected as shown below:

Drawings,
Figure 5, "MOVEMENT/POTATION" should read -- MOVEMENT/ROTATION --.
Figure 6, "ONIT" should read -- UNIT --.
Figure 10, "MOVEMENT/POTATION" should read -- MOVEMENT/ROTATION --.
Figure 14, "MOVEMENT/POTATION" should read -- MOVEMENT/ROTATION --.

Column 3,
Line 56, "unit." should read -- unit is determined. --.

Column 5,
Line 52, "havin" should read -- having --.

Column 10,
Line 60, "registrating" should read -- registering --.

Column 11,
Line 25, "coordinants" should read -- coordinates --;
Line 32, "three dimensional" should read -- three-dimensional --.

Column 12,
Line 25, "line-of sight;" should read -- line-of-sight; --;
Line 30, "line-of sight-" should read -- line-of-sight- --;
Line 63, "voice" should read -- voice recoginzer --.

Column 13,
Line 40, "An" should read -- A --.

Signed and Sealed this

Fifteenth Day of April, 2003

JAMES E. ROGAN
*Director of the United States Patent and Trademark Office*